US007492876B2

(12) United States Patent
Fujimoto

(10) Patent No.: US 7,492,876 B2
(45) Date of Patent: Feb. 17, 2009

(54) REMOTE CONTROL TERMINAL

(75) Inventor: Jun Fujimoto, Tokyo (JP)

(73) Assignee: Aruze Corp., Tokyo (JP)

( * ) Notice: Subject to any disclaimer, the term of this patent is extended or adjusted under 35 U.S.C. 154(b) by 845 days.

(21) Appl. No.: 10/735,665

(22) Filed: Dec. 16, 2003

(65) Prior Publication Data

US 2004/0130621 A1 Jul. 8, 2004

(30) Foreign Application Priority Data

Dec. 16, 2002 (JP) ............................ 2002-364486

(51) Int. Cl.
*H04M 11/00* (2006.01)

(52) U.S. Cl. ................ 379/102.01; 379/74; 379/93.17; 379/102.02; 455/420; 340/426.13; 348/14.05

(58) Field of Classification Search ............. 379/88.01, 379/93.12–93.13, 93.17, 102.01–102.07, 379/74–77; 463/42, 1; 455/420, 3.03, 419, 455/92, 151.1, 352; 348/143, 734, 14.05; 704/275; 715/716, 864; 340/426.13–426.17; 341/176

See application file for complete search history.

(56) References Cited

U.S. PATENT DOCUMENTS

| | | | | |
|---|---|---|---|---|
| 5,410,326 | A | 4/1995 | Goldstein | |
| 5,713,795 | A | 2/1998 | Kohorn | |
| 5,990,885 | A * | 11/1999 | Gopinath | 715/716 |
| 6,223,029 | B1 * | 4/2001 | Stenman et al. | 455/420 |
| 7,017,125 | B1 * | 3/2006 | Matsumoto | 715/864 |
| 2002/0094869 | A1 | 7/2002 | Harkham | |
| 2002/0147047 | A1 | 10/2002 | Letovsky et al. | |

FOREIGN PATENT DOCUMENTS

| | | |
|---|---|---|
| JP | 8-180115 | 7/1996 |
| JP | 2001-103061 | 4/2001 |
| JP | 2001-109710 | 4/2001 |
| JP | 2001-162011 | 6/2001 |
| JP | 2001-224814 | 8/2001 |
| JP | 2001-229350 | 8/2001 |
| JP | 2001-527717 | 12/2001 |
| JP | 2002-78965 | 3/2002 |
| JP | 2002-123619 | 4/2002 |
| JP | 2002-140631 | 5/2002 |
| JP | 2002-239178 | 8/2002 |
| JP | 2002-342495 | 11/2002 |
| JP | 2003-47775 | 2/2003 |
| JP | 2003-47779 | 2/2003 |
| JP | 2003-53041 | 2/2003 |
| JP | 2003-53042 | 2/2003 |
| JP | 2003-144760 | 5/2003 |
| JP | 2003-150838 | 5/2003 |
| JP | 2003-150852 | 5/2003 |
| JP | 2003-305274 | 10/2003 |

(Continued)

*Primary Examiner*—Md S Elahee
(74) *Attorney, Agent, or Firm*—Oblon, Spivak, McClelland, Maier & Neustadt, P.C.

(57) ABSTRACT

A remote control terminal includes an input section which allows selection of predetermined services offered from an information provider managing the services, a transceiver for obtaining a service selected by the input section from the information provider, and displaying means for displaying the contents of the service obtained by the transceiver.

12 Claims, 3 Drawing Sheets

FOREIGN PATENT DOCUMENTS

| | | | |
|---|---|---|---|
| WO | WO 98/49818 | | 11/1998 |
| WO | WO 99/19027 | | 4/1999 |
| WO | WO 00/79467 | A2 | 12/2000 |
| WO | WO 01/48713 | A1 | 7/2001 |
| WO | WO 01/54025 | A2 | 7/2001 |

* cited by examiner

FIG.2

| USER ID | NAME | NATIONALITY | GAME USED | ······ |
|---|---|---|---|---|
| 001 | A | ○ | SLOT MACHINE 22a<br>SLOT MACHINE 22b<br>ROULETTE<br>... | ······ |
| 0002 | B | × | SLOT MACHINE 22c<br>SLOT MACHINE 22d<br>... | ······ |
| ... | ... | ... | ... | ······ |

REMOTE CONTROL TERMINAL

CROSS REFERENCE TO THE RELATED APPLICATION

This application is based upon and claims the benefit of priority from the prior Japanese Patent Application No. P2002-364486, filed on Dec. 16, 2002; the entire contents of which are incorporated herein by reference.

This application is related to co-pending U.S. patent application entitled "An information providing system" referred to as the prior Japanese patent application P2002-364481, filed in Japan on Dec. 16, 2002. The co-pending application including specification, drawing and claims are expressly incorporated herein by reference in its entirety.

BACKGROUND OF THE INVENTION

1. Field of the Invention

The present invention relates to remote control terminals.

2. Description of the Related Art

A system in which a hotel gives guests cards with which to make payment and the like has been presented (see, e.g., the Japanese Patent Application No. P2002-123619 [pp. 3-7 and FIG. 1] or the Japanese Patent Application No. 8-180115 [pp. 7-23 and FIG. 1]).

For example, there is a system for providing services based on guest cards in which the details of guests entered in a hotel register are input upon check in. In the system, the guests use the cards for payment and the like eliminating the need to carry money about in order to obtain various services (cashless system).

Gaming industry operated casinos and the like have also been moving towards the adoption of cashless systems. There is, for example, a system in which users can play various games using cash cards, credit cards, or the like. The users can play games without paying for each individual game.

Development of such systems for providing cashless services has progressed. However, these systems are provided independently at different places where services are provided. For this reason, game arcades and hotels have not been able to improve their advantages to provide detailed services to users.

In order that a game arcade and a hotel can provide various detailed services to guests, the guests of the hotel are required to perform several operating procedures. This has often resulted in guests voluntarily rejecting the various services.

SUMMARY OF THE INVENTION

The present invention has been made in view of the above and has an object of providing a remote control terminal provided in each of the guest rooms in a hotel, which can easily obtain and display information corresponding to various services resulting from connection between a guest room and a game arcade (to facilitate a user's operation for obtaining the various services).

According to a first aspect of the present invention, there is provided a remote control terminal which comprises: a service manager for managing predetermined services; input means for selecting service provided from service manager; obtaining means for obtaining information corresponding to service selected by the input means from the service manager; and displaying the information corresponding in the service obtained by the obtaining means.

According to a second aspect of the present invention, storing means for storing a plurality of pieces of instruction information, wherein the pieces of instruction information show procedures for obtaining the services; the input means selects of a plurality of pieces of instruction information stored in storing means showing procedures for obtaining the services; the obtaining means obtains the instruction information selected by the input means from the storing means; and the displaying means displays the instruction information obtained by the obtaining means.

According to a third aspect of the present invention, the input means detects a telephone; and the obtaining means communicates the telephone selected by the input means.

In the third aspect of the present invention, the remote control terminal works as a telephone. A remote control terminal is provided in each guest room of a hotel, where it functions as a telephone. In this case, each of the remote control terminals enables guests of the guest room to communicate with each other.

According to a fourth aspect of the present invention, the remote control terminal further comprises speech recognition means for recognizing speech as a character string wherein, the obtaining means obtains from the service manager information corresponding to a service related to the character string, and the displaying means displays the information.

According to a fifth aspect of the present invention, the input means allows selection of images taken by a plurality of cameras provided in a game arcade for images of the situation in the game arcade; the obtaining means obtains at least one of the images selected by the input means as a service; and the displaying means displays the image obtained by the obtaining means.

BRIEF DESCRIPTION OF THE DRAWINGS

FIG. 2 is a diagram illustrating the contents of game information stored in a tabulation server according to the first embodiment.

DETAILED DESCRIPTION OF THE PREFERRED EMBODIMENTS

First Embodiment (Basic Configuration of Information Providing System)

Figure 1:
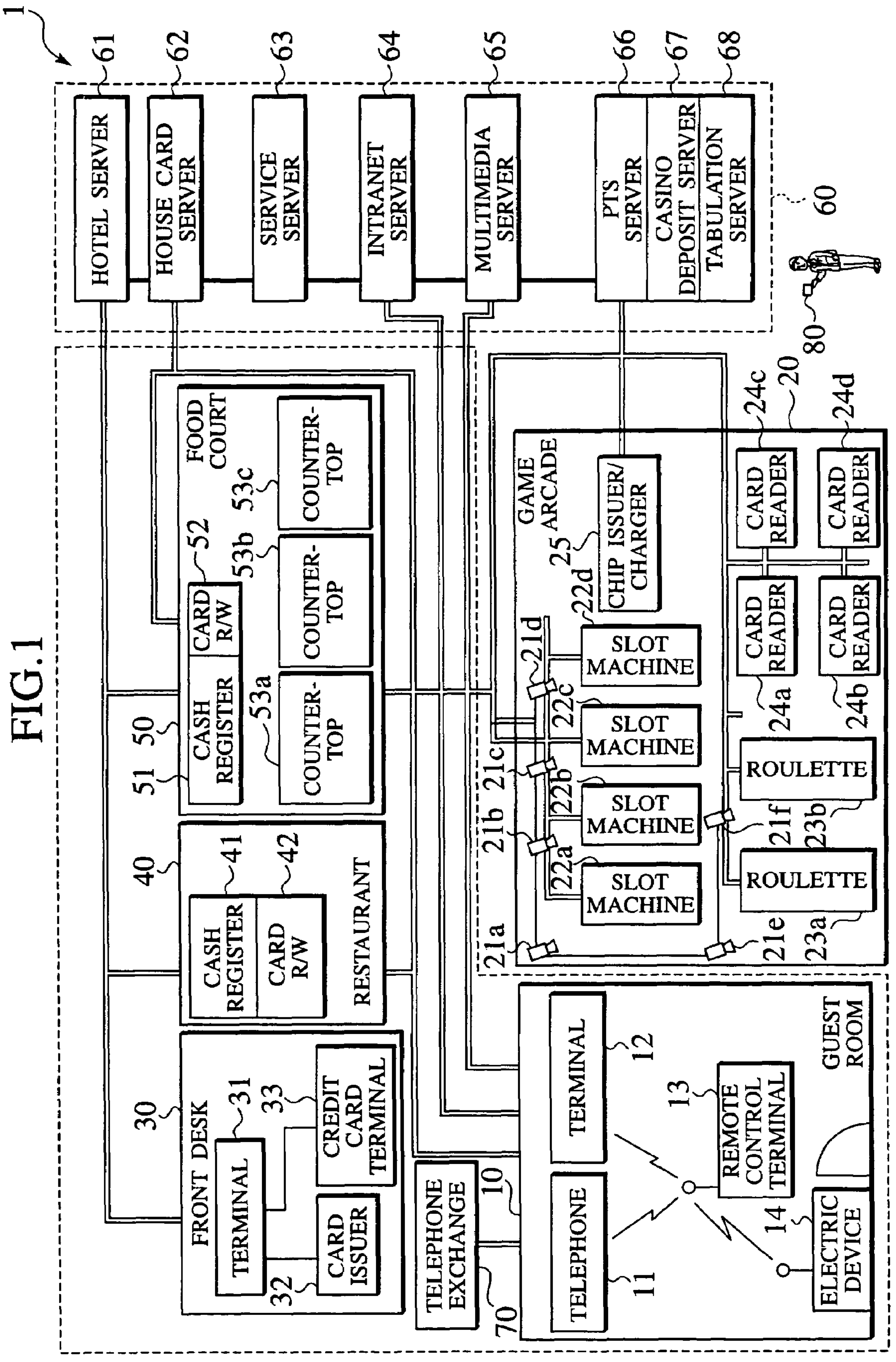
FIG. 1 is a block diagram illustrating an internal configuration of an information providing system according to a first embodiment of the present invention.

An information providing system 1 according to a first embodiment of the present invention will be described with reference to the figures. FIG. 1 is a diagram illustrating the internal configuration of the information providing system 1.

As shown in the figure, the information providing system 1 includes, in this embodiment, a guest room 10, a game arcade 20, a front desk 30, a restaurant 40, a food court 50, an information provider 60, and a telephone exchange 70. The front desk 30 registers and supervises the care of guests. The front desk 30 is provided with a terminal 31, a card issuer 32 and a credit card terminal 33 in this embodiment.

The terminal 31 receives user information on guests. A player which performs a game in the game arcade 20 is contained in the user. The user information (first identifier) identifies a user or guest, including an ID assigned to the user or guest, the name, address, nationality, contact address and length of stay of the user or guest. Specifically, the terminal 31 reads user information stored in a card 80 a guest holds. The terminal 31 having read the user information stores the read user information in a hotel server 61.

The card issuer 32 issues the card 80 for obtaining services offered in the hotel. The credit card terminal 33 charges services obtained by the guest in the hotel or the game arcade 20.

The restaurant 40 serves various kinds of food and drink. The restaurant 40 is provided with a cash register 41 and a card R/W 42 in this embodiment. The cash register 41 charges food and drink ordered by a guest. The card R/W 42 reads monetary information from the card 80 held by the guest. The monetary information includes, for example, the bank code and the bank account of the user.

The food court 50 offers various kinds of food and drink. The food court 50 is provided with a cash register 51, a card R/W 52 and countertops 53*a* to 53*c* in this embodiment. The cash register 51 and the card R/W 52 function the same as the above-described cash register 41 and card R/W 42. The countertops 53*a* to 53*c* are places where food and drink are served or places where guests and others eat and drink.

The game arcade 20 is provided with cameras 21*a* to 21*f*, slot machines 22*a* to 22*d*, roulettes 23*a* and 23*b*, card readers 24*a* to 24*d* and a chip issuing/charging machine 25 in this embodiment. The cameras 21*a* to 21*f* take images of the situation in the game arcade 20. The chip issuing/charging machine 25 obtains monetary information produced when users play games with the slot machines 22*a* to 22*d* and roulette 23*a* and 23*b*, and charges amounts included in the obtained monetary information.

The card readers 24*a* to 24*d* read user information held by users when the users play games with the slot machines 22*a* to 22*d* and roulettes 23*a* and 23*b*. Before starting games with the slot machines 22*a* to 22*d* and roulette 23*a* and 23*b*, the users cause the card readers 24*a* to 24*d* to read the user information stored in the cards 80 the users hold.

The card readers 24*a* to 24*d* may store second identifier (game information including IDs assigned to gaming machines) for identification of gaming machines including the slot machines 22*a* to 22*d* and roulettes 23*a* and 23*b* installed in the game arcade 20, and read the user information stored in the cards 80 together with the second identifier. The card readers 24*a* to 24*d* may read the first identifier stored in the cards 80.

The guest room 10 is provided with a telephone 11 and a terminal 12 (display terminal) in this embodiment. The telephone 11 is for transmitting and receiving speech between a guest and another person via the telephone exchange 70. The terminal 12 selectively displays images of the situation in the game arcade 20 taken by the cameras 21*a* to 21*f*. More specifically, the terminal 12 causes the screen to selectively display images of the situation in the game arcade 20 input via a multimedia server 65.

The terminal 12 causes the screen to display game information read by the card readers 24*a* to 24*d*. Specifically, the terminal 12 causes the screen to display user information read by the card readers 24*a* to 24*d*, or user information and second identifier in association with one another.

The information provider 60 manages predetermined services, including, in this embodiment, the hotel server 61, a house card server 62, a service server 63, an intranet service server 64, the multimedia server 65, a PTS server 66, a casino deposit server 67 and a tabulation server 68. The information provider 60 including a service manager and a memory The hotel server 61 manages information read by the terminal 31 and cash registers 41 and 51 provided in the hotel. The house card server 62 manages house cards. Specifically, the house card server 62 manages service charges for various services offered to users in the hotel for settlement of the charges.

The house card server 62 also manages bank accounts and the like of guests staying in the hotel. The service server 63 accepts reservations for a show or event and issues tickets for the show or event.

The intranet service server 64 provides various games (on-demand game services). More specifically, in response to a request from the terminal 12, the intranet service server 64 provides various games managed by the intranet service server 64 to the terminal 12. The intranet service server 64 also causes the screen of the terminal 12 to selectively display images taken by the cameras 21*a* to 21*f* and allows the guest to participate in a game displayed on the screen.

The multimedia server 65 manages videos to be delivered to the terminal 12. More specifically, the multimedia server 65 offers a service of delivering videos managed by the multimedia server 65 to the terminal 12 in response to a request from the terminal 12 (on-demand video service).

The PTS server 66 manages various game programs. Specifically, the PTS server 66 transmits a program managed by the PTS server 66 to the terminal 12 in response to a request from the terminal 12. The casino deposit server 67 clears charges for users' use of games with the slot machines 22*a* to 22*d*, roulettes 23*a* and 23*b* and the like.

Users cause the card readers 24*a* to 24*d* to read monetary information stored in their cards 80. The read monetary information includes a set maximum amount that the user can use in the game arcade 20. The casino deposit server 67 obtains the monetary information and subtracts charged amounts from the maximum amount included in the obtained monetary information (deposit service).

A user previously sets the maximum amount of money available in the game arcade 20 or hotel in the casino deposit server 67 by the user's input operation. The casino deposit server 67 may subtract the amount of charges to the user produced in the game arcade 20 or the hotel from the set maximum amount (deposit service).

The tabulation server 68 manages game information for each user. The game information includes, as shown in FIG. 2, a user ID identifying a user, user information including the name and nationality of the user, and IDs of games or various gaming machines played by the user. The tabulation sever 68 obtains game information read by the card readers 24*a* to 24*d* and stores the obtained game information in the server.

The tabulation server 68 stored with the game information counts, for example, the stored number of each second identifier as game information for each gaming machine. The tabulation server 68 transmits the tabulated game information of each gaming machine to the terminal 12. The terminal 12 receives the game information from the tabulation server 68 and displays the received game information on each gaming machine.

The tabulation server 68 counts the number of game participants for each kind of game based on the game information stored in the server. The tabulation server 68 may include the number of medals won by users, the results of games, monetary information read by the card readers 24*a* to 24*d* from the cards 80 of users, and the like in the game information for management. The game information may include goods purchased by users and places where users play games. An analyzer of the game information can thus be easily aware of users' preferences and behavioral patterns.

The servers 61 to 68 manage, for each user ID, hotel charges paid at the front desk 30, charges paid at the restaurant 40 and the food court 50, charges at the game arcade 20, charges for room services offered via the terminal 12, charges for correspondence sales and the like. The servers 61 to 68 can thus manage sales at the restaurant 40 and the like for each user.

When a user makes payment for charges in the hotel or the game arcade 20, the servers 61 to 68, the terminals 31, 33 or the cash registers 41 and 51 may obtain identification information including the personal identification number from the card 80 of the user and charge an amount included in the monetary information stored in the card 80 when the obtained identification information agrees with stored identification information. The servers 61 to 68 can thus charge a user only when the user's identification information has been verified, thus resulting in improved security in charging.

The terminal 12 may be connected to the Internet. A network in the hotel or the game arcade 20 is connected to external Internet networks, so that the manager of the hotel or the game arcade 20 can offer services provided on the Internet. As a result, the manager can offer more detailed services to guests.

Servers in banking institutions used by users and the terminal 12 may be connected to the Internet. The casino deposit server 67 identifies bank accounts related to user IDs managed by the banking institution servers connected to the Internet, based on user IDs included in monetary information read by the card readers 24*a* to 24*d*.

The casino deposit server 67 having identified the bank accounts charges amounts included in the read monetary information to the identified bank accounts. The manager of the hotel or the game arcade 20 can establish an Internet casino based in a game arcade such as a casino.

ID tags may be embedded in game media (e.g., chips) for use in roulette or card games. The ID tags are read by a tag reader installed in the vicinity of the slot machines 22*a* to 22*d* and the roulettes 23*a* and 23*b*. The tag reader having read the ID tags outputs the read ID tags to the tabulation server 68.

The tabulation server 68 stores game information including the input ID tags and the names of gaming machines related to the ID tags. A staff in the game arcade 20 can refer to the game information stored in the tabulation server 68 to control game media movement without the help of dealers or the like. As a result, the manager can simplify the management and offer diversified services using the game information.

According to the embodiment of this invention, the terminal 12 selectively displays images of the situation in the game arcade 20 taken by the cameras 21*a* to 21*f*. A guest staying in the guest room 10 can enjoy seeing images of the situation in the game arcade 20 without going down to the game arcade 20.

Since the terminal 12 can display game information of users present in the game arcade 20, a guest can easily identify users participating in the roulette 23*a*, 23*b* or the like, seeing the game information displayed on the terminal 12, and also can enjoy seeing images of the situation in the game arcade 20.

Since the terminal 12 displays numbers counted by the tabulation server 68 for each gaming machine, a guest can easily know the number of users using each gaming machine. When the number of participants in a game of the roulette 23*a* or 23*b* is low, the guest is motivated to participate in the game of the roulette 23*a* or 23*b*. The hotel provides guests with the service of displaying at the terminal 12 information on the game arcade 20, thereby improving it's ability to attract customers.

Second Embodiment

(Basic Configuration of Remote Control Terminal)

Figure 3:
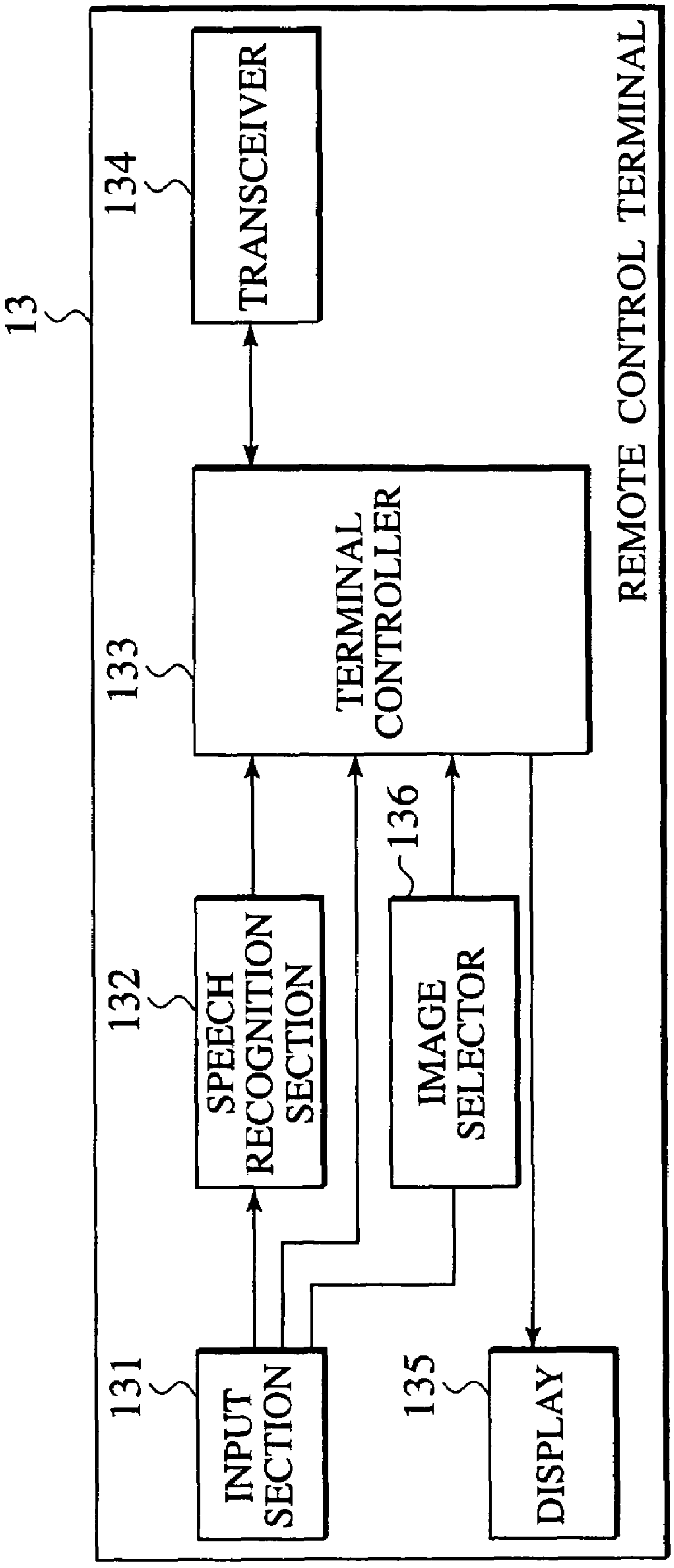
FIG. 3 is a diagram illustrating an internal structure of a remote control terminal according to a second embodiment of the present invention.

The configuration of a second embodiment is basically identical to that in the first embodiment, but differs in that a remote control terminal 13 (display terminal) and an electric device 14 are included (see FIG. 1). As shown in FIG. 3, the remote control terminal 13 includes, in this embodiment, an input section 131, a speech recognition section 132, a terminal controller 133, a transceiver 134, a display 135 and an image selector 136. The remote control terminal 13 may also include a telephone function.

The input section 131 allows selection of predetermined services offered from the information provider 60 for providing the services. The information provider 60 may alternatively be installed in the game arcade 20 or the hotel.

The predetermined services include the service of transmitting images taken by the camera 21*a* to 21*f* and the service of transmitting instruction information showing procedures for obtaining services.

Information corresponding to the predetermined services includes graphics and characters in addition to images and instruction information.

The input section 131 allows selection of images taken by the cameras 21*a* to 21*f*. The input section 131 allows selection of instruction information (e.g., operating manuals) stored in the servers 61 to 68. The servers 61 to 68 store a plurality of instruction information pieces showing procedures for obtaining services. The instruction information is not limited to that stored in the servers 61 to 68 and may be stored in any part other than the servers 61 to 68. For example, the instruction information may be stored in the remote control terminal 13.

The input section 131 allows selection of the receiving end of the telephone line. The input section 131 outputs command signals to the terminal controller 133 for executing functions in accordance with various information selected. The functions include an operating function, an instructing function, and a mediation function.

The operating function includes control of the electric device 14 (e.g., adjustment of an air conditioner), processing for letting a user participate in a game played via the terminal 12, and processing for selection of services offered from the servers 61 to 68. The electric device 14 may be an air conditioner, audio equipment, a video, a recorder, a camera, a printer or a personal computer.

The instructing function includes processing for instructing the obtaining of instruction information for operating the remote control terminal 13 via the transceiver 134 and displaying the instruction information obtained via the transceiver 134 on the display 135. The mediation function includes processing for establishing communication between another end of the telephone line installed in any other room and the transceiver 134. The mediation function allows a user to select a button "connect to front desk" provided at the input section 131 so that the remote control terminal 13 establishes communication between the remote control terminal 13 and a telephone at the hotel front desk.

By the mediating function, the telephone at the front desk may indicate an access (access information) from the remote control terminal 13. A hotel employee can get back to the corresponding user based on the access information indicated on the telephone.

The speech recognition section 132 recognizes a user's speech as a character string. The image selector 136 executes selection of images taken by the cameras 21*a* to 21*f* according to an instruction from the input section 131. The display 135 displays the contents of services obtained by the transceiver 134.

The transceiver 134 obtains a service selected at the input section 131 from the information provider 60. The transceiver 134 obtains an image selected at the image selector 136 from the corresponding one of the cameras 21*a* to 21*f* as information corresponding to the service. The transceiver 134 obtains instruction information selected at the input section 131 from the servers 61 to 68.

The transceiver 134 establishes communication between a telephone selected at the input section 131 and the transceiver 134. The transceiver 134 obtains services related to character strings recognized at the speech recognition section 132 from the servers 61 to 68.

The display 135 displays information corresponding to a service obtained via the transceiver 134. The display 135 also displays instruction information obtained via the transceiver 134. The display 135 also displays images obtained via the transceiver 134 (images of the cameras 21*a* to 21*f*).

According to the second embodiment of the present invention, the remote control terminal 13 can obtain a service selected at the input section 131 from the information provider 60, so that the remote control terminal 13 can easily obtain and display information corresponding to various services resulting from connection between the guest room 10 and the game arcade 20. A user can thus obtain various services via the remote control terminal 13 by an easy operation.

The remote control terminal 13 obtains an image selected at the input section 131 from the corresponding one of the cameras 21*a* to 21*f* as information corresponding to a service. A user can thus obtain images of various gaming machines in the game arcade 20 by an easy operation.

The remote control terminal 13 can obtain instruction information selected at the input section 131 from the servers 61 to 68. A user can thus refer to instruction information obtained via the remote control terminal 13 to easily enjoy various services offered by the game arcade 20 or the hotel.

The remote control terminal 13 can establish communication between a telephone selected at the input section 131 and the transceiver 134. A user can thus select the button "connect to front desk" provided at the input section 131 so that the remote control terminal 13 establishes communication between the remote control terminal 13 and a telephone at the hotel front desk.

The remote control terminal 13 can obtain a service related to a character string recognized at the speech recognition section 312 from the information provider 60. A user can thus easily obtain various services by voice control without operating the remote control terminal 13.

Additional advantages and modifications will readily occur to those skilled in the art. Therefore, the invention in its broader aspects is not limited to the specific details and the representative embodiments shown and described herein. Accordingly, various modifications may be made without departing from the spirit or scope of the general inventive concept as defined by the appended claims.

What is claimed is:

1. A remote control terminal, comprising:

input means for selecting of predetermined services provided from a service manager which manages the predetermined services;

obtaining means for obtaining information corresponding to a service selected by the input means from the service manager; and displaying means for displaying the information corresponding to the service obtained by the obtaining means to a user, wherein the service manager includes storing means for storing a plurality of pieces of instruction information, the pieces of instruction information showing the user procedures how to obtain the predetermined services and being referred to by the user, the input means selects of the plurality of pieces of instruction information stored in the storing means and selects a telephone, the obtaining means obtains the instruction information selected by the input means from the storing means and communicates the telephone selected by the input means, and the displaying means displays the instruction information obtained by the obtaining means, the instruction information showing the user the procedures how to obtain the selected service and being referred to by the user.

2. The remote control terminal as set forth in claim 1, wherein the remote control terminal works as a telephone.

3. The remote control terminal as set forth in claim 1, wherein the remote control terminal is provided in a guest room.

4. The remote control terminal as set forth in claim 1, further comprising:

speech recognition means for recognizing speech as a character string; wherein, the obtaining means obtains from the service manager information corresponding to a service related to the character string; and the displaying means displays the information.

5. The remote control terminal as set forth in claim 1, wherein:

the input means allows selection of images taken by a plurality of cameras provided in a game arcade for taking images of a situation in the game arcade;

the obtaining means obtains at least one of the images selected by the input means as information corresponding to the service; and the displaying means displays the image obtained by the obtaining means.

6. The remote control terminal as set forth in claim 1, wherein the obtaining means controls an electric device.

7. The remote control terminal as set forth in claim 6, wherein the electric device is an air conditioner, audio equipment, a video, a camera, a printer, or a personal computer.

8. The remote control terminal as set forth in claim 6, wherein the obtaining means is connected to the Internet.

9. The remote control terminal as set forth in claim 1, further comprising:

a transceiver configured to obtain an image from the obtaining means.

10. The remote control terminal as set forth in claim 1, wherein the remote control terminal receives tabulated game information from a tabulation server.

11. The remote control terminal as set forth in claim 10, wherein the displaying means displays information tabulated by the tabulation server, said information including tracking goods purchased by users and places where users play games.

12. A remote control terminal, comprising:

an input section configured to select of predetermined services provided from a service manager which manages the predetermined services;

an obtainer configured to obtain information corresponding to a service selected by the input section from the service manager; and a display configured to display the information corresponding to the service obtained by the obtainer to a user, wherein the service manager includes a storing section configured to store a plurality of pieces of instruction information, the pieces of instruction information showing the user procedures how to obtain the predetermined services and being referred to by the user, the input section selects of the plurality of pieces of instruction information stored in the storing section and selects a telephone, the obtainer obtains the instruction information selected by the input section from the storing section and communicates the telephone selected by the input section, the display displays the instruction information obtained by the obtainer, the instruction information showing the user the procedures how to obtain the selected service and being referred to by the user.

* * * * *